Patented Mar. 12, 1935

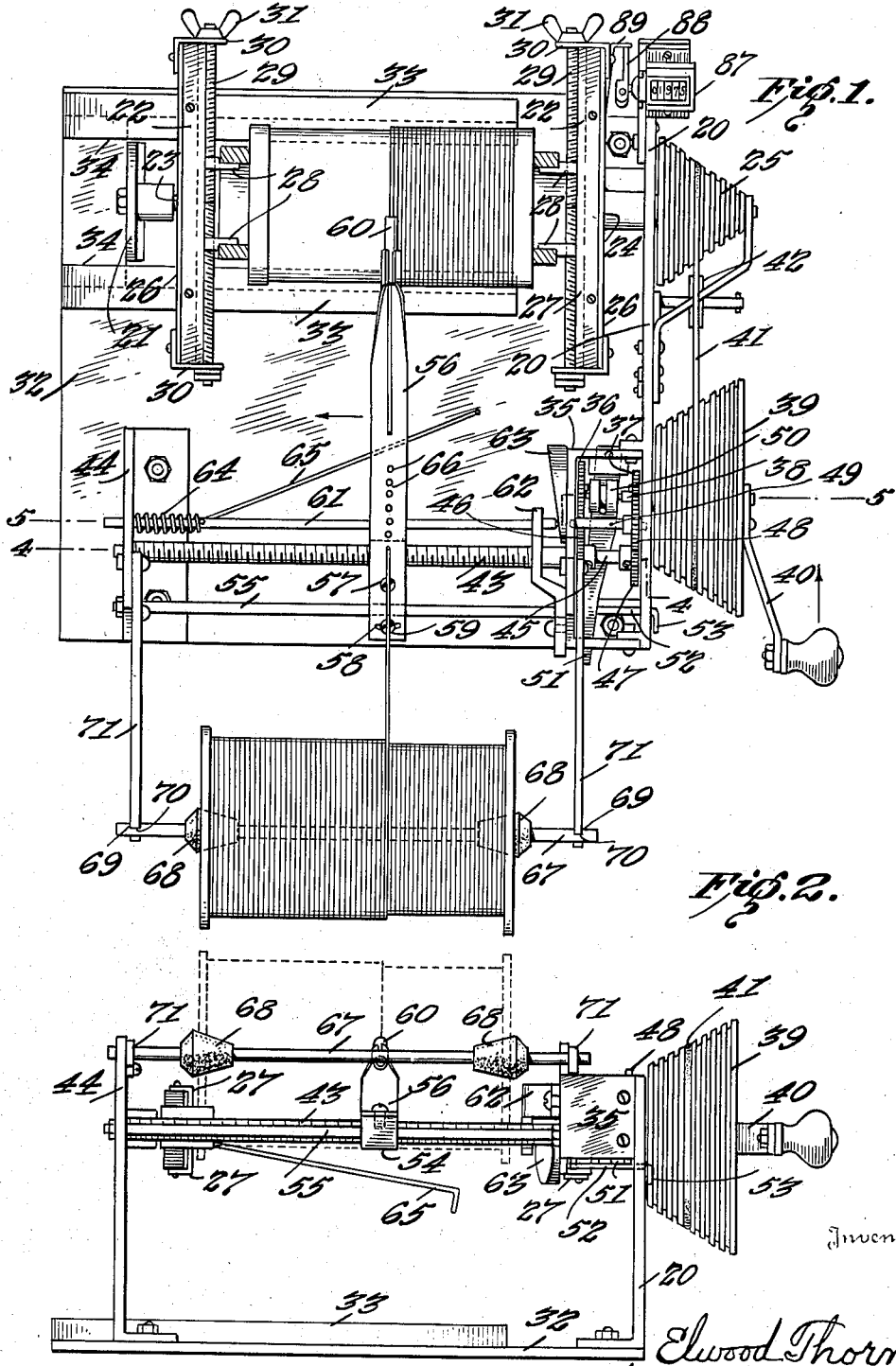

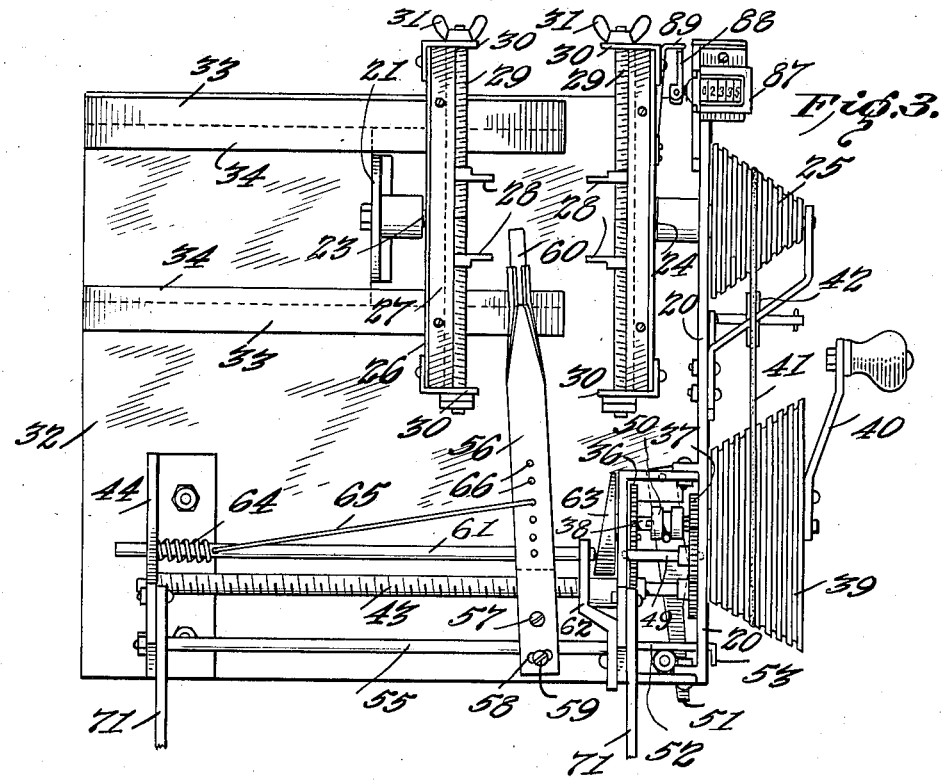

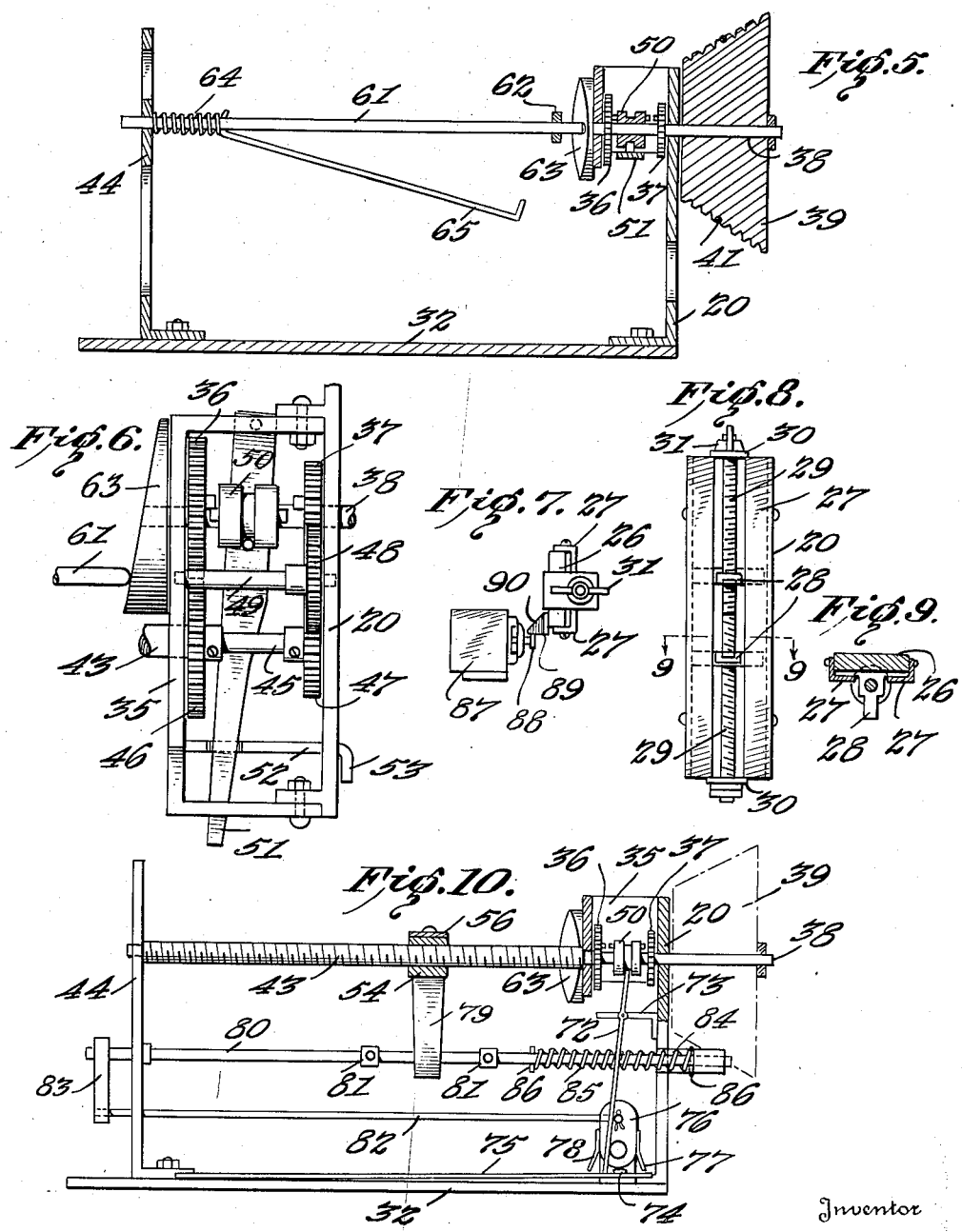

1,994,373

UNITED STATES PATENT OFFICE 1,994,373

COIL WINDER

Elwood Thorne, Miami, Fla.

Application July 25, 1933, Serial No. 682,143

4 Claims. (Cl. 242—9)

The object of the invention is to provide a machine for winding various forms of coils used in radio work or other electrical work, so that the operations may be carried out with facility, the required number of convolutions indicated to a nicety and the convolutions spaced or laid close to each other, to provide a coil winder in which the speed of the head and tail stock may be regulated to suit the diameter employed, when the driving means, such as a hand crank is rotated substantially at constant speed; to provide stocks adjustable to suit any diameter of core; to provide a spool holding means to impose a resistance to free turning of the supply spool, so that the wire may be properly tensioned when laid on the core; to provide a cross feed which is automatically operable in either direction; and generally to provide a machine of the kind indicated which is of comparatively simple form and susceptible of cheap manufacture.

With this object in view, the invention consists of a construction and combination of parts of which a preferred embodiment is illustrated in the accompanying drawings, wherein:

Figure 1 is a top plan view.

Figure 2 is an end elevational view looking at the supply spool.

Figure 3 is a view similar to Figure 1, omitting the supply spool and the coil form but showing the feed arm connected for oscillatory movement.

Figures 4 and 5 are sectional views on the planes indicated by the lines 4—4 and 5—5 respectively of Figure 1.

Figure 6 is an enlarged plan view of the feed screw driving mechanism.

Figure 7 is a detail end view of the counter and chuck with the cooperating actuating finger.

Figure 8 is a front elevational view of one of the chucks.

Figure 9 is a sectional view on the plane indicated by line 9—9 of Figure 8.

Figure 10 is a view partly in elevation and partly in section showing the feed screw reversing mechanism in a modified form.

Figure 11 is a detail view partly in section of the clutch lever latch.

Figure 12 is a detail elevational view illustrating the bracket supporting the cam end of the arm oscillating rod.

The core of the coil to be wound is supported jointly from head stock 20 and the tail stock 21, each of which is equipped with a chuck 22, that chuck carried by the tail stock having a stem 23 journaled in the upper end of the tail stock, so that the chuck will rotate freely. The chuck carried by the head stock is provided with spindle 24 journaled in a bearing of the head stock and extending far enough to the opposite side of head stock to receive the cone 25 by means of which rotary movement is imparted to it and its attendant chuck. The stem of the tail chuck and the spindle of the head chuck are axially aligned, so that they rotate on a common axis. Each chuck comprises a cross bar 26 provided with inturned flanges 27 which together with the upper face of the cross bar constitute guides for the jaws 28. Each chuck embodies a pair of jaws disposed one on each side of the axis of rotation of the chuck and they are moved uniformly toward and away from each other by means of a right and left screw 29 which is journaled in ears 30 at opposite ends of the cross bar, the screw being designed for manual actuation by means of the wing nut 31 carried at its one end.

The chuck jaws are designed for interior gripping since the coil forms are as a rule hollow, but they may be used for external gripping where occasion requires it, since they are readily actuable either for positive movement toward or away from each other.

Both the head and tail stocks are mounted on a common base 32, the former being fixed to the base by being permanently mounted thereon but the latter being slidably mounted on the base by reason of guides 33 carried by the same and between which the foot of the tail stock is disposed. The guides are under-cut to provide lips 34 overlapping the foot portion of the tail stock. The tail stock is thus adjustable toward and away from the head stock to accommodate any length of coil form.

The head stock is in the form of a frame and to one side of its chuck is provided with a housing member 35 in which are housed a plurality of gears, the gears 36 and 37 being mounted on a shaft 38 which is journaled in one wall of the housing member and extends through the latter to receive the cone 39 which is a companion to the cone 25 and which is provided with a crank 40 for manual operation. A belt 41 traverses the cones and is tensioned by an idler 42. The gears 36 and 37 are designed to selectively actuate the feed screw 43 which is journaled at one end in a bracket 44 and the other end in one wall of the housing member 35, having a reduced portion 45 extending across to the head stock frame 20. The reduced portion 45 carries the gears 46 and 47, the former of which is in mesh with the gear 36 and the latter of which is in mesh with the idler gear 48 carried on a short shaft 49 journaled in the wall of the housing member and the head stock frame 20. The idler gear 48 also meshes with the gear 37. The gears 36 and 37 rotate freely on the shaft 38, but either of them may be engaged with the shaft by the shifting of clutch member 50 which has axial but not angular movement with respect to the shaft. If the clutch member be engaged with the gear 36, the feed screw will be rotated in one direction, but if engaged with the gear 37, the feed screw will rotate in the opposite direction by reason of the interposed idler gear 48.

The clutch member is actuated by means of a clutch lever 51 which is pivotally mounted at one end on the under side of the housing member and extends far enough beyond the other end of the housing member to provide a finger grip by means of which it may be swung to shift the clutch member into either of its gear engaging positions or into its neutral position. The clutch lever may be latched in any of its positions by means of the cam latch 52 which is in the form of a pin pivotally mounted in one wall of the housing member and in the frame 20 and has an angular end 53 exterior to the frame 20. Within the housing, the pin is formed with angularly related flats either of which may be brought into facing relation with the latch member by turning the angular end. One flat leaves the lever free but the other forces it into engagement with the underside of the housing member, so that it is precluded from being shifted unless by the application of an exceptional force.

The feed screw 43 is designed to impart movement to the carriage 54, the carriage being formed with a threaded opening through which the screw passes. The carriage is jointly supported by the screw and by the guide rod 55 which parallels the screw and which is terminally supported by the bracket 44 and the housing member 35. The carriage carries a feed arm 56 pivotally mounted at 57 on the carriage, so that it may be moved angularly with respect thereto, the amount of angular movement being limited by the arcuate slot 58 in the arm and the screw 59 carried by the carriage and passing through the slot. The arm at the free end carries a tubular insulating bushing 60.

Wire being wound on the form passes through the bushing of the guide arm prior to the delivery to the form and windings of certain character necessitate oscillation of the arm. This is automatically accomplished by means of an axially movable rod 61 mounted at one end in the bracket 44 and at the other end in the bracket 62 which is carried by but spaced from the housing member. The rod extends through the bracket 62 to engage the face of a cam 63 which is carried on that end of the shaft 38 extending through the wall of the housing member 35. A spring 64 surrounds the rod and tends to force it towards the cam, bearing one end against the bracket 44 and the other end against the angular extremity of the link 65, this angular extremity being disposed in a hole formed diametrically through the rod. The opposite end of the link has a similarly formed angular end for selective engagement in any one of the series of holes 66 formed in the feed arm. The link is disengageable from the feed arm but if engaged in any of the holes of the latter it will cause oscillation of the arm when the shaft 38 is turned, the cam forcing the rod in one direction and the spring returning it.

The spool carrying the wire supply is carried on the rod 67 which is provided with rubber cones 68 which are frictionally mounted on the rod and whose smaller ends enter the bore of the spool. The degree with which the cones are set determines the freedom with which the spool will move, since the rod is precluded from turning movement by the reason of the lateral slots 69 with which it is formed being engaged with the sides of the slots 70 formed in the arms 71, the slots 70 constituting seats for the rod and the arms 71 supports for the latter. The arms 71 are swingingly mounted respectively on the bracket 44 and the housing member 35, being limited to horizontal position when arranged as a spool support, when they project beyond the base. When not in use they may be folded over above the base.

The modified form of the invention comprises means for automatically effecting clutch shifting movement. In this form of the invention, a clutch lever 72 replaces the clutch member 51, being pivotally mounted at an intermediate point on a bracket 73 carried by the head stock frame 20. The lower end of the lever is disposed in obstructing relation to a block 74 carried on the upper face of a leaf spring 75 which is mounted on the base 32 but has a spring tendency upwardly from the latter. When the end of the lever is on one side of the block, the clutch member 50 is engaged with the gear 36 and when disposed on the other side of the block, the clutch member is engaged with the gear 37. With whichever gear the clutch is engaged, it may not be engaged with the other gear without first depressing the spring to move the block out of its obstructing position with reference to the clutch lever. Spring depression is accomplished by movement of a rocker 76 which is provided on opposite sides with fingers 77 and 78 either of which may engage the spring. Swinging movement is imparted to the rocker from the carriage which is provided with a tail extension 79 having a hole through which the rod 80 passes, the rod being slidably mounted in the bracket 44 and in the head stock frame 20 and having adjustable spaced stops 81. The rod has an operative connection with a second rod 82 consisting of a plate 83 with which the extremities of both rods are connected. The remote terminal of the rod 82 is pivotally connected with rocker 76.

The rod 80 passes through an opening in the clutch lever 72 and the springs 84 and 85 with which it is provided are disposed on opposite sides of the clutch lever and bear against the same. The remote ends of the springs abut the stops 86.

With the clutch member engaged with the gear 37, the lower end of the clutch member will be on the left side of the block 74 and abut the left side edge and the rocker 76 will be in neutral position by reason of the springs 84 and 85 so positioning the rods 80 and 82 to accomplish this. But with this operative connection of the clutch and gear, the carriage will be moving to the right as viewed in Figure 10 of the drawings and will continue this movement, engaging the right hand stop 81, shifting both the rods 80 and 82 to the right and compressing the spring 85. When the rods have been moved far enough to swing the rocker 76 a sufficient distance to the right, finger 77 will engaged and depress the spring 75, so that the block will be lowered out of obstructed position with reference to the clutch lever, leaving the latter free to move. But during this time the spring 85 has been compressed and is free to expand when the lever is released, thus swinging the lever and shifting the clutch member into engagement with the gear 36 which will result in the carriage moving in the opposite direction, when the rods will return to their normal positions, leaving the spring 75 free to elevate the block into obstructing relation with the lever but on the opposite side of the block than formerly. The carriage will thus move in the opposite direction until it engages the other stop 81, shifting the rods in the opposite direction, compressing the spring 84 and releasing the block from the clutch lever by depressing the spring 75 with the finger 78.

It will thus be seen that this construction provides for the automatic movement of the carriage back and forth.

Since the number of convolutions in a coil is vital when it is to constitute one of several matched inductances, it is essential that provision be made for counting the number of turns wound. Therefore a counter 87 is mounted on head stock frame 20 where its arm 88 may be engaged by a resilient finger 89 on the head stock, the finger engaging and depressing the arm in the one direction of rotation of the head stock, but springing over the arm in the reverse direction of the head stock by reason of the inclined nose 90 of the finger engaging the counter arm and thus forcing the finger backwardly, so that it may spring past the arm. Thus the proper direction of rotation will effect the operation of the counter, while the reverse will leave the counter unaffected.

In the operation of the invention, the form is clamped to the head and tail chucks by the proper adjustment of the jaws of the latter and the bodily adjustment of the tail stock toward the head stock to correspond to the length of the form. The supply spool, having been placed on the spool rod is adjusted to turn with the requisite resistance to tension the wire by setting the cones 68 to give the necessary friction. The end of the wire is then trained through the bushing 60 on the feed arm 56 and terminally anchored to the core. The winding operation is then begun after the clutch lever 51 has been shifted to lock the gear 36 to the cone shaft 38. Imparting turning movement to the crank imparts rotation to the head chuck, core and tail chuck and, by reason of rotation of the feed screw imparts lateral movement to the carriage and thus to the feed arm, laying the convolutions of the coil in equally spaced turns. When the counter indicates that the requisite number of turns have been made, the completed coil may be removed and another core mounted, when the winding of that may be accomplished by shifting a clutch lever to lock the gear 37 to the cone shaft. The winding may be then continued as formerly, but the carriage will move laterally in the opposite direction because of the reverse direction of rotation imparted to the feed screw. If the second coil to be wound is to be the mechanical duplicate of the first, the feed arm is returned to its original position before the winding begins and by turning the cone shaft in a reverse direction with the gear 36 clutched to the shaft. This reversal of rotation will leave the counter unaffected.

If the coil being wound is of a honeycomb form, or the basket weave form, or of any character necessitating the oscillation of the feed arm, the clutch lever 51 is shifted to neutral position after the carriage has been properly positioned. The feed screw is thus left inactive. The link 65 is then engaged in the proper hole 66 in the feed arm to give the desired arc of oscillation to the latter, the winding of the core or form being then continued as before, the wire being swung back and forth by the feed arm as it is laid on the core.

The driving operation imparted to the head stock is accomplished through mechanism comprising stepped cones by means of which the speed of the head chuck may be varied for a fixed angular speed of the crank. Thus the speed may be varied in accordance with the size of the wire being wound.

The arc of oscillation of the feed arm 56 may be varied by adjusting the cam end of the rod 61 with respect to the center of cam 63, the slot $62^1$ in the bracket 62 permitting this adjustment. This adjustment of the arm operating rod 61 together with the holes 66 in the arm 56 provides for co-ordinating the arm and cam so as to secure the desired arc of oscillation of the arm and its occurring in the proper zone with respect to the form being wound. The bracket 62 is formed with the yoke extension $62^a$ extending underneath the feed screw 43 which maintains the general position of the bracket 62 in making any adjustment of the latter.

The invention having been described what is claimed as new and useful is:

1. A machine of the character described comprising a rotary core carrier, a spool carrier, a feed arm interposed between the spool carrier and the core carrier, means for imparting rotary movement to the core carrier, and means operatively connected with the last said means for selectively imparting oscillating movement to the feed arm or lateral movement to the same.

2. A machine of the character described comprising a rotary core carrier, a spool carrier, a feed arm interposed between the spool carrier and the core carrier, means for imparting rotary movement to the core carrier and simultaneously imparting lateral movement to the feed arm, means included in the last said means to effect movement of the feed arm in either direction when the core carrier is rotating or to retain the feed arm at rest, and means operatively connected with the first said means for imparting oscillating movement to the feed arm, the last said means having an element selectively engageable with and disengageable from the feed arm.

3. A machine of the character described comprising a rotary core carrier, a spool carrier, a feed arm interposed between the spool carrier and the core carrier, means for imparting movement to the core carrier, a cam rotated by said means, a push rod yieldingly impelled toward the cam, the feed arm having a pivotal mounting and a link connecting the push rod with the feed arm, the push rod having an adjustable mounting adjacent to the cam to selectively position it with respect to the cam to vary the effective throw of the latter and thereby secure a definite length of stroke of the push rod.

4. A machine of the character described comprising a rotary core carrier, a spool carrier, a feed arm interposed between the spool carrier and the core carrier, a crank for imparting movement to the core carrier a face cam rotated by the crank, a push rod yieldingly impelled toward the cam and having an adjustable support adjacent the cam to adjust the corresponding end of said rod radially of the cam to vary the effective throw of the cam, the feed arm having a pivotal mounting, and a link connecting the push rod with the feed arm, the feed arm having a series of spaced holes and the link having an angular terminal selectively engageable in any one of them.

ELWOOD THORNE.